United States Patent
Kim

(10) Patent No.: US 7,751,781 B2
(45) Date of Patent: Jul. 6, 2010

(54) MULTI-TRANSCEIVER SYSTEM AND METHODS OF COMPENSATING OFFSET FREQUENCY

(75) Inventor: Dong-Kyu Kim, Seongnam-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 1089 days.

(21) Appl. No.: 11/246,397

(22) Filed: Oct. 11, 2005

(65) Prior Publication Data

US 2006/0135077 A1 Jun. 22, 2006

(30) Foreign Application Priority Data

Dec. 21, 2004 (KR) .................... 10-2004-0109829

(51) Int. Cl.
*H04B 17/00* (2006.01)
(52) U.S. Cl. .............. 455/67.14; 455/115.1; 455/115.2; 455/226.1
(58) Field of Classification Search .............. 455/67.11, 455/67.13, 67.14, 68, 69, 70, 115.1, 115.2, 455/226.1
See application file for complete search history.

(56) References Cited

U.S. PATENT DOCUMENTS

| | | | | |
|---|---|---|---|---|
| 5,930,243 A | * | 7/1999 | Parish et al. ............... | 370/334 |
| 6,501,806 B1 | * | 12/2002 | Rouvellou et al. .......... | 375/285 |
| 2002/0122382 A1 | | 9/2002 | Ma et al. | |
| 2003/0153273 A1 | * | 8/2003 | Ebert et al. ............... | 455/67.4 |
| 2004/0067741 A1 | * | 4/2004 | Fei et al. ................... | 455/192.1 |
| 2004/0124848 A1 | * | 7/2004 | Tran et al. .................. | 324/543 |
| 2004/0219892 A1 | | 11/2004 | Vaidyanathan et al. | |
| 2004/0248519 A1 | * | 12/2004 | Niemela .................. | 455/67.11 |
| 2005/0047384 A1 | * | 3/2005 | Wax et al. .................... | 370/338 |
| 2005/0287956 A1 | * | 12/2005 | Golden et al. ............ | 455/67.16 |

FOREIGN PATENT DOCUMENTS

| | | |
|---|---|---|
| GB | 2 359 456 A | 8/2001 |
| JP | 2002-135033 | 5/2002 |
| JP | 2003-092508 | 3/2003 |
| JP | 2004-072458 A | 3/2004 |
| KR | 2002-0037626 A | 5/2002 |
| KR | 10-2003-0007680 | 1/2003 |
| KR | 2003-0043980 A | 6/2003 |
| KR | 2003-0063034 A | 7/2003 |
| WO | WO 02/29978 A2 | 4/2002 |
| WO | WO 2004/025841 A2 | 3/2004 |

OTHER PUBLICATIONS

Search and examination report for corresponding British Application No. GB0526057.5 dated May 9, 2006.
Korean Office Action with English Translation dated Aug. 1, 2006.

* cited by examiner

*Primary Examiner*—Tuan A Pham
(74) *Attorney, Agent, or Firm*—Harness, Dickey & Pierce, P.L.C.

(57) ABSTRACT

Disclosed is a multi-transceiver system adapted to estimate a frequency offset on basis of a test signal and a reference signal. Transceivers in the multi-transceiver system are adapted to transmit signals compensated with the frequency offsets.

14 Claims, 4 Drawing Sheets

MULTI-TRANSCEIVER SYSTEM AND METHODS OF COMPENSATING OFFSET FREQUENCY

CLAIM OF PRIORITY

A claim of priority under 35 U.S.C. §119 is made to Korean Patent Application 2004-109829 filed on Dec. 21, 2004, the entire contents of which are hereby incorporated by reference.

BACKGROUND

Example embodiments of the present invention generally relate to a multi-transceiver system.

One method of overcoming problems associated with a frequency band confined to a limited range is to transmit/receive a plurality of signals in parallel using a multi-input multi-output (MIMO) channel with a plurality of antennas and transceivers.

FIG. 1 is a block diagram schematically illustrating a multi-transceiver system as disclosed in the prior art.

Referring to FIG. 1, a first multi-transceiver system 1000 includes transceivers 100-1~100-$n$ and antennas 101-1~101-$n$, and a second multi-transceiver system 2000 includes transceivers 200-1~200-$m$ and antennas 201-1~201-$m$. Between the first multi-transceiver and second systems 1000 and 2000, the MIMO channels are arranged in number of n*m.

Such a communication system enhances the frequency utility efficiency up to n times, because it is able to transmit/receive n signals simultaneously in the same frequency band. However, quality of signals may be heavily dependent on carrier frequencies of transmitting and receiving sites.

Carrier frequencies of each of the transmission signals sent in parallel are identical to each other. If the carrier frequencies of the transmission signals are different from each other, the receivers may be disabled to trace offset points and the frequencies may be corrected, which may cause the restoration of their original signals to be difficult.

SUMMARY OF THE INVENTION

The present invention is directed to a multi-transceiver system and method of matching carrier frequencies of a plurality of transceivers embedded therein.

In an example embodiment of the present invention, a method of adjusting a frequency offset for a multitransceiver system includes transferring a test signal from a first transceiver to a second transceiver, estimating a frequency offset of the test signal and a reference signal, and transmitting signals from the first and second transceivers, wherein the second transceiver transmits the signal compensated with the estimated frequency offset.

In another example embodiment of the present invention, a method of adjusting a frequency offset for a multitranceiver system includes comparing a first carrier wave signal with a second carrier wave signal to estimate a frequency offset, and transmitting a signal compensated with the estimated frequency offset.

In still another example embodiment of the present invention, a multi-transceiver system includes a first transceiver adapted to transmit and receive a first signal, a second transceiver adapted to transmit and receive a second signal, and a first switching circuit adapted to transfer the first signal from the first transceiver to the second transceiver, wherein the second transceiver estimates a frequency offset between the first signal and a reference signal.

BRIEF DESCRIPTION OF THE DRAWINGS

The accompanying drawings are included to provide a better understanding of the example embodiments of the present invention, and are incorporated in and constitute a part of this specification. The drawings illustrate example embodiments of the present invention and, together with the description, serve to explain the example embodiments of the present invention. In the drawings.

DETAILED DESCRIPTION OF EXAMPLE EMBODIMENTS

Example embodiments of the present invention will be described below in more detail with reference to the accompanying drawings. The present invention may, however, be embodied in different forms and should not be constructed as limited to the example embodiments set forth herein. Rather, these embodiments are provided as working examples. Like numerals refer to like elements throughout the specification.

Figure 2:
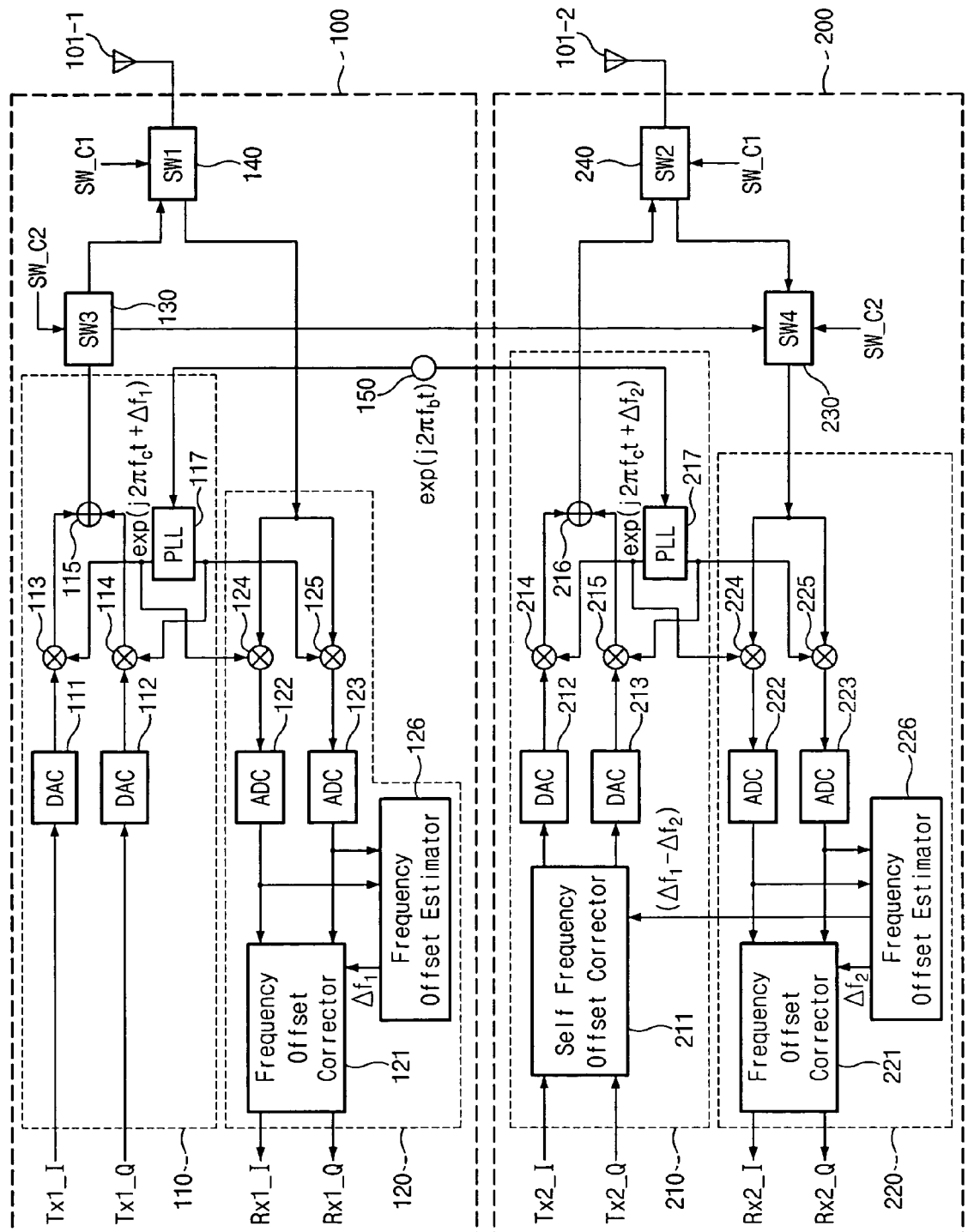
FIG. 2 is a block diagram illustrating a configuration of a multi-transceiver system according to an example embodiment of the present invention.

FIG. 2 is a block diagram illustrating a configuration of a multi-transceiver system according to an example embodiment of the present invention.

Referring to FIG. 2, a multi-transceiver system 3000 may include two transceivers 100 and 200, and an oscillator 150. However, the multi-transceiver system 3000 may include more than 2 transceivers. In an example embodiment and for explanation purposes, the transceiver 100 is designated as a reference transceiver.

The transceiver 100 may include a transmitter 110, a receiver 120, and switches 130 and 140. The transmitter 110 may further include digital-analog converters (DAC) 111 and 112, mixers 113 and 114, a summation circuit 115, and a phase locked loop (PLL) 117. The DACs 111 and 112 may convert digital signals TX1_I and TX1_Q from a processing unit (not shown) to analog signals. The PLL 117 receives a first carrier-wave signal $Exp(j2\pi fbt)$ from the oscillator 150 and generates a second carrier-wave signal $Exp(j2\pi fct+\Delta f1)$. The mixers 113 and 114 respectively mixes the analog signals from the DACs 111 and 112 with the second carrier-wave signal $Exp(j2\pi fct+\Delta f1)$, and outputs the mixed signals to the summation circuit 115. Then the summation circuit 115 generates a transmission signal by summing the mixed signals.

The receiver 120 may include a frequency offset corrector 121, analog-digital converters (ADC) 122 and 123, mixers 124 and 125, and a frequency offset estimator 126. The mixers 124 and 125 respectively mixes reception signals with the second carrier-wave signal $Exp(j2\pi fct+\Delta f1)$, and then output the respective mixed signals to the ADCs 122 and 123. The ADCs 122 and 123 convert the analog signals into digital signals. The frequency offset estimator 126 determines a frequency offset from the analog signals supplied by the ADCs 122 and 123. In other words, the frequency offset estimator 126 evaluates a difference between a carrier wave frequency of a transmission signal sent from a transmission site and a carrier wave frequency of a practical reception signal. In general, the carrier wave frequency of the transmission signal is estimated by means of a preamble field of the transmission signal, e.g., the carrier frequency offset is obtained from the preamble field of the transmission signal. The frequency offset corrector 121 outputs signals RX1_I and RX1_Q. The signals RX1_I and RX1_Q are signals wherein the carrier frequencies of the analog signals from the ADCs 122 and 123 are corrected with the frequency offsets provided by the frequency offset estimator 126. As such, the processing unit performs a precise data restoring operation.

The transceiver 200 may include a transmitter 210, a receiver 220, and switches 230 and 240. The transmitter 210 is similar to the transmitter 110, except that the transmitter 210 may further include a self frequency offset corrector 211.

Signals TX2_I and TX2_Q pass through the self frequency offset corrector 211, and then the digital signals are converted into analog signals by DACs 212 and 213. A PLL 217 of the transmitter 210 generates a second carrier-wave signal Exp (j2πfct+Δf2) from a first carrier-wave signal Exp(j2πfbt). The first carrier-wave signal Exp(j2πfbt) is generated by the oscillator 150.

Mixers 214 and 215 respectively mixes the analog signals from the DACs 212 and 213 with the second carrier-wave signal Exp(j2πfct+Δf2), and output the mixed signals to a summation circuit 216. The summation circuit 216 generates a transmission signal by summing the mixed signals.

The receiver 220 may include a frequency offset corrector 221, analog-digital converters (ADC) 222 and 223, mixers 224 and 225, and a frequency offset estimator 226. The mixers 224 and 225 mixes reception signals with the second carrier-wave signal Exp(j2πfct+Δf2), and then outputs the mixed signals to the ADCs 222 and 223, respectively. The ADCs 222 and 223 convert the analog signals into digital signals. The frequency offset estimator 226 determines a frequency offset of the reception signals from the analog signals supplied by the ADCs 222 and 223. In other words, the frequency offset estimator 226 is able to obtain a difference between carrier wave frequencies of the reception signal with reference to a carrier wave frequency defined in the preamble field of the reception signal. The frequency offset corrector 221 outputs signals RX2_I and RX2_Q in which the carrier frequencies of the analog signals from the ADCs 222 and 223 are corrected with the frequency offsets provided by the frequency offset estimator 226. As such, the processing unit performs a precise data restoring operation.

To match the carrier frequencies of the transceivers 100 and 200 to each other, the PLLs 117 and 217 each generate second carrier-wave signals from first carrier-wave signals Exp (j2πfbt) generated by the same oscillator 150. But, the second carrier-wave signals generated respectively from the independent PLLs 117 and 217 are completely coincided with each other. Hereinafter, such difference between the carrier frequencies is referred to as a self frequency offset.

Figure 1:
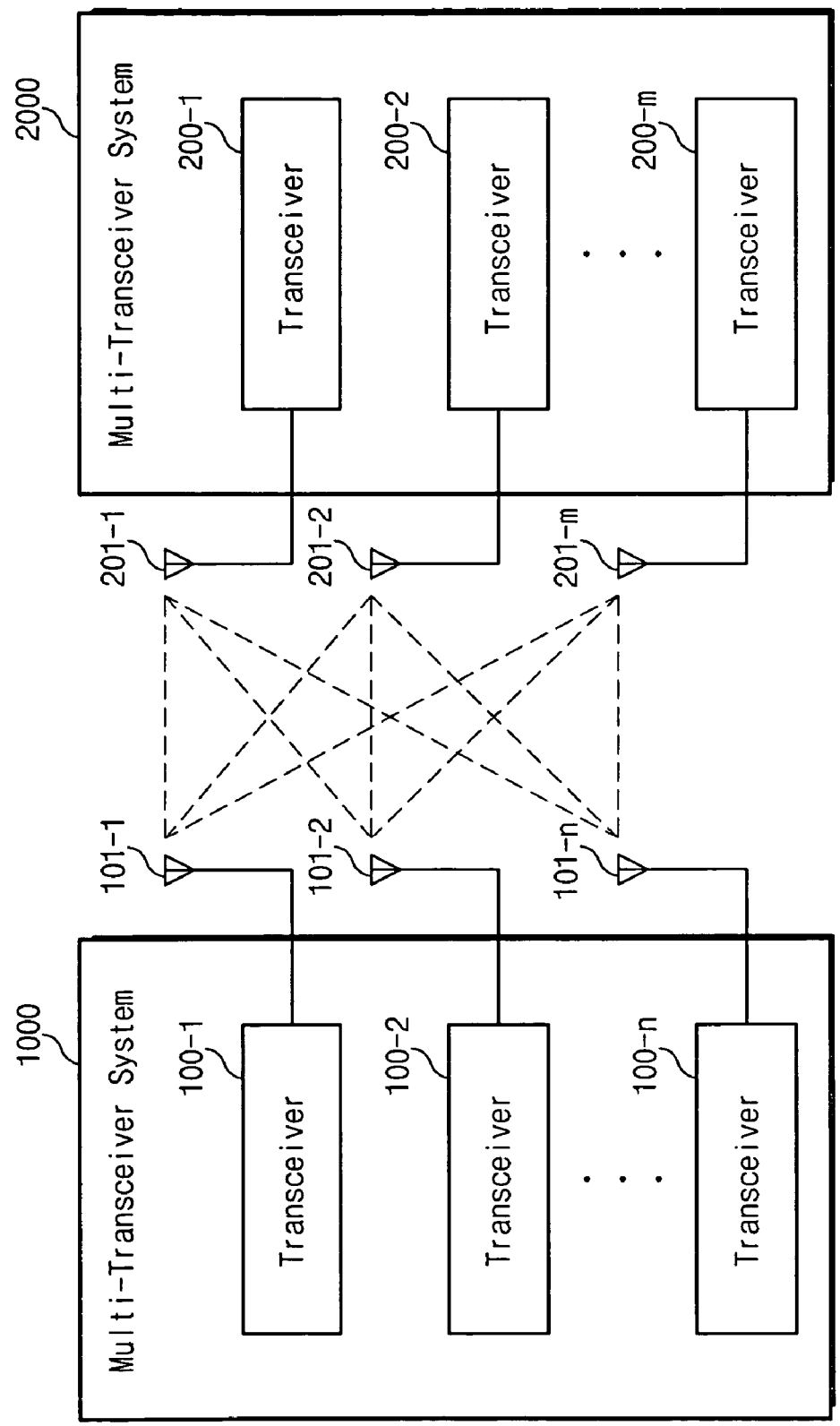
FIG. 1 is a block diagram schematically illustrating a prior art multi-transceiver system.

Assuming in FIG. 1, the first multi-transceiver system 1000 is designated as a transmitting site, and the second multi-transceiver system 2000 is designated as a receiving site, the transmission signals output from the transceivers 100-1~100-n are transferred in parallel to the transceivers 200-1~200-m. During the transmission, it is difficult for the transceivers 200-1~200-m to correctly estimate frequency offsets due to self frequency offsets between the transmission signals output from the transceivers 100-1~100-n, which makes accurate restoration for the reception signals difficult.

Thus, the self frequency offsets between the transmission signals output from the transceivers 100-1~100-n must be minimized.

Figure 3:
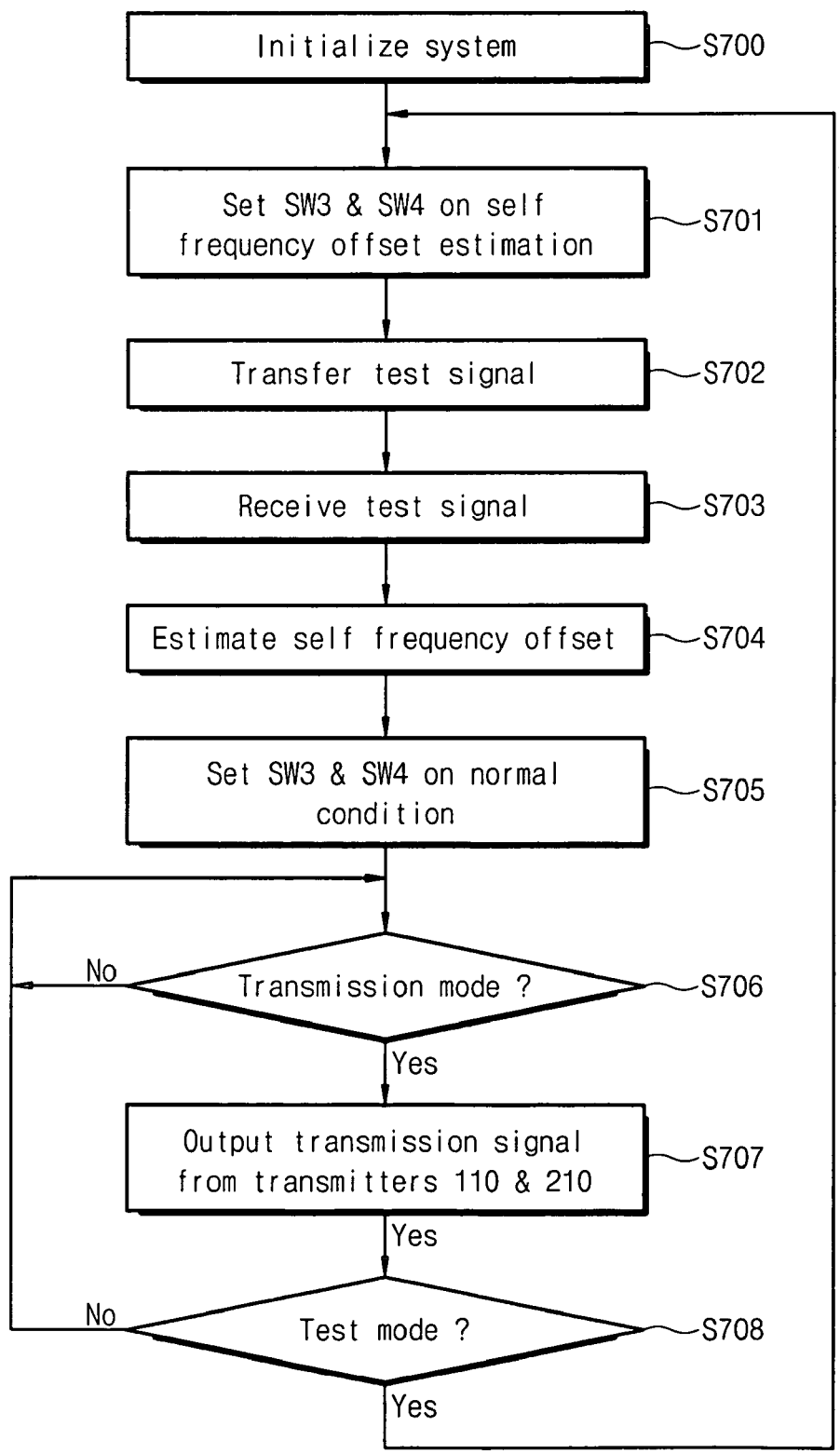
FIG. 3 is a flow chart illustrating an operational procedure of the multi-transceiver system according to an example embodiment of the present invention.

The multi-transceiver system 3000 according to the example embodiment of the present invention, shown in FIG. 2, is capable of correcting the self frequency offsets between the transmission signals. FIG. 3 is a flow chart illustrating an operational procedure of the multi-transceiver system according to an example embodiment of the present invention.

In FIG. 2, the switches 140 and 240 are set in response to a switching signal SW_C1, which determines the transmission/reception mode. The switch 140 transfers a transmission signal from the transmitter 110 through the switch 130 to the antenna 101-1 when the switching signal SW_C1 is set to a transmission mode. The switch 140 transfers a reception signal from the antenna 101-1 to the receiver 110 when the switching signal SW_C1 is set to a reception mode.

The switch 240 transfers a transmission signal from the transmitter 210 to the antenna 101-2 when the switching signal SW_C1 is set to the transmission mode. The switch 240 transfers a reception signal from the antenna 101-2 to the receiver 220 when the switching signal SW_C1 is set to the reception mode.

The switches 130 and 230 are set in response to a switching signal SW_C2 that represents normal transmission/test modes. The normal mode generally refers to the transmission/reception mode between the multi-transceiver system and an external apparatus, and the test mode generally refers to an estimation mode for the self frequency offset. The switch 130 transfers a transmission signal from the transmitter 110 to the switch 140 when the switching signal SW_C2 is set to the normal mode. The switch 130 transfers a transmission signal from the transmitter 110 to the receiver 220 when the switching signal SW_C2 is set to the test mode.

The switch 230 transfers a reception signal to the receiver 220 through the switch 240 from the antenna 101-2 when the switching signal SW_C2 is set for the normal mode. The switch 230 transfers the transmission signal to the receiver 220 from the transmitter 110 through switch 130 when the switching signal SW_C2 is set to the test mode.

Referring to FIG. 3, in S700, the multi-transceiver system 3000 is initialized; the initialization includes procedures to reset circuit components, and establish conditions to process and transmission/reception signals.

In S701, the switches 130 and 230 are set to estimate a self frequency offset. In other words, the signal SW_C2 is set to a test mode, and switch 130 is set to transfer a transmission (e.g., test) signal from the transmitter 110 to the switch 230, and the switch 230 is set to transfer the transmission signal from the switch 130 to the receiver 220.

Figure 4:
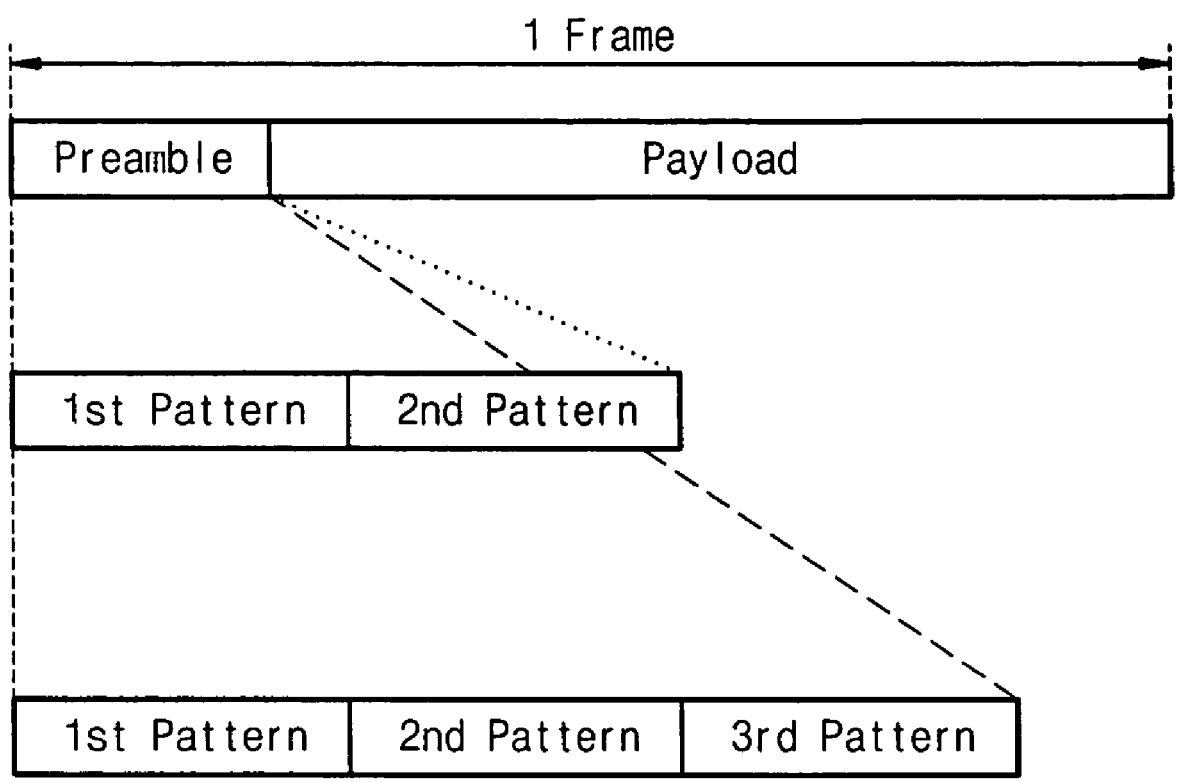
FIG. 4 is a schematic diagram illustrating a structure of a test signal.

In S702, the transmitter 110 transfers the transmission (test) signal. FIG. 4 illustrates the test signal structure. A frame of the transmission signal transferred from the transmitter 110 may include preamble and payload fields. The preamble field is utilized to estimating a sync and channel of the receiver. The payload field contains data. In the test mode, the preamble field may include a signal to estimate the self frequency offset, and the payload field may include null data. In the example embodiment, the preamble field preferably contains a test pattern repeated more than twice.

Assuming that an nth sample output from a transmitter is s(n), and an nth sample output from a receiver is r(n), the relationship with phase revolution by a frequency offset Δf is represented by Equation 1. The parameter Ts means a sampling term.

$$r(n)=s(n)\cdot e^{j2\pi \Delta fnTs}$$ [Equation 1]

When there are the same patterns every N sampling terms, s(n) and s(n+N) are identical to each other. But, if there is a frequency offset, the phase is modified with revolution by the frequency offset when evaluating an angle of phase rotation after obtaining a conjugate complex-multiplied value between two samples, which is summarized as follows.

$$\Delta f = \frac{1}{2\pi NTs}\tan^{-1}\left[\sum_{n=i}^{i+L}r(n+N)\cdot r^n(n)\right]$$ [Equation 2]

In general, the self frequency offset is a very small value. Therefore, as shown in FIG. 4, if the test pattern included in the preamble is continuously arranged with more than three, the performance of the estimation may be enhanced by extending an interval between sampling values of one pair taken with the conjugate complex-multiplication.

$$\Delta f = \frac{1}{2\pi(2N)Ts}\tan^{-1}\left[\sum_{n=i}^{i+L}r(n+2N)\cdot r^n(n)\right]$$ [Equation 3]

Returning to FIGS. 2 and 3, in S703, the receiver 220 receives the test signal transferred from the transmitter 110 by way of the switches 130 and 230.

In S704, the frequency offset estimator 226 determines the self frequency offset of the transmission (test) signal. The self frequency offset, which is a difference between the offset frequency Δf1 of the reference transceiver 100 and the offset frequency Δf2 of the transceiver 200, is transferred to the self frequency offset corrector 211.

In S705, the switches 130 and 230 are set to a normal mode. In other words, when the switching signal SW_C2 is set to a normal mode, the switch 130 is set to transfer a transmission signal from the transmitter 110 to the switch 140, and the switch 230 is set to transfer a signal from the switch 240 to the receiver 220.

By establishing the self frequency offset by the self frequency offset corrector 211 and setting the switches 130 and 230 to the normal mode, the test mode is completed.

In S706, this step determines whether the multi-transceiver system 3000 is in a normal transmission mode. If the multi-transceiver system 3000 is in the normal transmission mode, the process moves to S707.

In S707, the switch 140 transfers a transmission signal to the antenna 101-1 from the transmitter 110 through the switch 130, and the switch 240 transfers a transmission signal to the antenna 101-2 from the transmitter 210. During this process, signals TX2_I and TX2_Q output from the processing unit (not shown) to the transceiver 200 are provided respectively to DACs 212 and 213 after passing through the self frequency offset corrector 211. Thus, the self frequency offset between the transmission signals output through the antennas 101-1 and 101-2 from the transmitters 110 and 210 are zero.

The test mode to estimate the self frequency offset may be carried out during a standby mode that does not accompany with signal transception, as well as just after the initialization of the multi-transceiver system 3000. Therefore, in S708, this step determines whether the multi-transceiver system 3000 is in the test mode. If the multi-transceiver system 3000 is in the test mode, the process returns to S701 to repeat the aforementioned operation of estimating the self frequency offset.

By periodically estimating the self frequency offset and repeating the estimation, it may be possible to eliminate the self frequency offset between the transmitters 100 and 200.

If the multi-transceiver system 3000 includes more than two transceivers, one of the transceivers may be assigned as a reference transceiver, and remaining transceivers each may include a self frequency offset corrector. The non-reference transceivers having the self frequency offset corrector compensate the self frequency offsets on basis of the test signal provided by the reference transceiver. Thus, even though the multi-transceiver system 3000 may include n transceivers, it is possible to set the self frequency offset to zero between transmission signals output from all the transceivers.

According example embodiments of the present invention, it may be possible to prevent carrier frequency offset between the transmission signals output from the multi-transceiver system having a plurality of transceivers, which may improve the signal quality of the multi-transceiver system.

Although the present invention has been described in connection with the example embodiments of the present invention, it will be apparent to those skilled in the art that various substitution, modifications and changes may be thereto without departing from the scope of the present invention.

What is claimed is:

1. A method of compensating a frequency offset for a multi-transceiver system, comprising:
   transferring, using a switching circuit, a test signal from a first transceiver of the multi-transceiver system to a second transceiver of the multi-transceiver system during a test mode;
   estimating a frequency offset of the test signal and a reference signal; and
   transmitting, using the switching circuit, non-test signals from the first and second transceivers to an external apparatus during a normal mode;
   wherein the second transceiver transmits the non-test signals compensated with the estimated frequency offset, and
   wherein, during the test mode, the test signal contains a second carrier wave signal, and estimating the offset frequency includes comparing the second carrier wave signal with a third carrier wave signal using a frequency offset estimator included in the second transceiver.

2. The method as set forth in claim 1, wherein the frequency offset is a carrier frequency offset between the test signal and the reference signal.

3. The method as set forth in claim 1, wherein the test signal includes a preamble and a payload.

4. The method as set forth in claim 3, wherein the preamble includes a carrier wave signal.

5. The method as set forth in claim 1, wherein the signals include at least two test patterns.

6. A multi-transceiver system, comprising:
   a first transceiver configured to transmit and receive a non-test signal;
   a second transceiver connected to the first transceiver by at least one wire and configured to transmit and receive a test signal; and
   a first switching circuit configured to transfer the test signal from the first transceiver to the second transceiver by the at least one wire during a test mode, and configured to transmit the non-test signal from the first and second transceivers to an external apparatus during a normal mode,
   wherein the second transceiver estimates a frequency offset between the test signal and a reference signal, and wherein, during the test mode, the test signal contains a second carrier wave signal, and the frequency offset estimator compares the second carrier wave signal with a third carrier wave signal to estimate the offset frequency.

7. The multi-transceiver system as set forth in claim 6, wherein the frequency offset is a carrier frequency offset between the test signal and the reference signal.

8. The multi-transceiver system as set forth in claim 6, wherein the second transceiver comprises:
   a frequency offset estimator adapted to estimate the frequency offset of the test signal and the reference signal; and
   a self frequency offset corrector adapted to receive the estimated frequency offset and generate the non-test signal compensated with the estimated frequency offset.

9. The multi-transceiver system as set forth in claim 6, wherein the test signal is transferred from the first transceiver to the second transceiver during the test mode.

10. The multi-transceiver system as set forth in claim 9, wherein the test signal contains at least two test patterns.

11. The multi-transceiver system as set forth in claim 6, wherein the second transceiver transmits the non-test signal compensated with the estimated frequency offset during the normal transmission mode.

12. The multi-transceiver system as set forth in claim 6, wherein the first switching circuit is disposed in the first transceiver.

13. The multi-transceiver system as set forth in claim 6, further comprising a second switching circuit disposed in the second transceiver and adapted to transfer the test signal from the first switching circuit to a frequency offset estimator during the test mode, and adapted to transmit the non-test signal compensated with the estimated frequency offset to the external apparatus during the normal transmission mode.

14. The multi-transceiver system as set forth in claim 6, further comprising:
   an oscillator to generate a first carrier wave signal;
   a first phase locked loop (PLL) disposed in the first transceiver and adapted to receive the first carrier wave signal, and adapted to convert the first carrier wave signal to a second carrier wave signal; and
   a second phase locked loop (PLL) disposed in the second transceiver and adapted to receive the first carrier wave signal, and adapted to convert the first carrier wave signal to a third carrier wave signal.

* * * * *